United States Patent
Zhu et al.

(10) Patent No.: US 12,471,275 B2
(45) Date of Patent: Nov. 11, 2025

(54) ANTI-FUSE ARRAY AND MEMORY

(71) Applicant: CHANGXIN MEMORY TECHNOLOGIES, INC., Hefei (CN)

(72) Inventors: Dongbo Zhu, Hefei (CN); Ming-Hui Huang, Hefei (CN); Tzung-Han Lee, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 412 days.

(21) Appl. No.: 18/151,452

(22) Filed: Jan. 8, 2023

(65) Prior Publication Data
US 2024/0049461 A1 Feb. 8, 2024

(30) Foreign Application Priority Data
Aug. 2, 2022 (CN) .......................... 202210923922.4

(51) Int. Cl.
*H10B 20/25* (2023.01)
*G11C 17/16* (2006.01)
*G11C 17/18* (2006.01)
*H01L 23/525* (2006.01)

(52) U.S. Cl.
CPC ............. *H10B 20/25* (2023.02); *G11C 17/16* (2013.01); *G11C 17/18* (2013.01); *H01L 23/5252* (2013.01)

(58) Field of Classification Search
CPC .................................. H10B 20/25; G11C 17/16
See application file for complete search history.

(56) References Cited

U.S. PATENT DOCUMENTS

2021/0202504 A1* 7/2021 Chang ................. H01L 23/5252
2023/0320083 A1* 10/2023 Li .......................... H10B 20/25
257/379

FOREIGN PATENT DOCUMENTS

CN 105869678 B 8/2020

* cited by examiner

*Primary Examiner* — Kevin Parendo
(74) *Attorney, Agent, or Firm* — Kilpatrick Townsend & Stockton LLP

(57) ABSTRACT

Embodiments relate to an anti-fuse array and a memory. The anti-fuse array includes: a column of first active areas, where each of the first active areas includes a first channel region, a first source/drain region and a second source/drain region, and a first programming region; a column of second active areas, where each of the second active areas includes a second channel region, a third source/drain region and a fourth source/drain region, and a second programming region, an end portion, close to the first active areas, of the given second active area directly faces a region between end portions, close to the given second active area, of two adjacent first active areas; a first gate line; a second gate line covering each second channel region in a column of the second active areas; and a programming gate line.

16 Claims, 3 Drawing Sheets

ANTI-FUSE ARRAY AND MEMORY

CROSS-REFERENCE TO RELATED APPLICATION

This application claims priority to Chinese Patent Application No. 202210923922.4, titled "ANTI-FUSE ARRAY AND MEMORY" and filed to the State Patent Intellectual Property Office on Aug. 2, 2022, the entire contents of which are incorporated herein by reference.

TECHNICAL FIELD

Embodiments of the present disclosure relate to the field of semiconductor technology, and more particularly, to an anti-fuse array and a memory.

BACKGROUND

As a non-volatile memory that supports one time programming, a one time programmable (OTP) memory is widely used in the fields of analog circuits, digital chips/system on chips (SOCs), static random access memories (SRAMs)/dynamic random access memories (DRAMs) and the like. A one time programmable anti-fuse memory is a type of one time programmable memory. In an unprogrammed state, the anti-fuse memory is in a high-resistance state due to existence of an insulating dielectric layer. After programming, the insulating dielectric layer is broken down, such that the anti-fuse memory is in a low-resistance state, thereby completing a write operation.

However, with rapid development of integrated circuit technologies, density of devices in an integrated circuit is getting higher and higher, and dimensions of semiconductor devices are continuously reduced to meet demands. Therefore, how to improve an integration level of an anti-fuse array has become a problem to be solved urgently.

SUMMARY

Embodiments of the present disclosure provide an anti-fuse array and a memory.

The embodiments of the present disclosure provide an anti-fuse array, which includes: at least a column of first active areas, at least a column of second active areas, a first gate line, a second gate line, and a programming gate line. The first active areas extend along a first direction, and each of the first active areas includes: a first channel region, a first source/drain region and a second source/drain region disposed on two sides of the first channel region, and a first programming region. The first programming region is disposed at an end portion of a given one of the first active areas, and a distance between end portions of adjacent two of the first active areas is greater than a distance between central portions of the adjacent two of the first active areas. The second active areas extend along the first direction, and each of the second active areas includes: a second channel region, a third source/drain region and a fourth source/drain region disposed on two sides of the second channel region, and a second programming region. The second programming region is disposed at an end portion of a given one of the second active areas, where an end portion, close to the first active areas, of the given second active area directly faces a region between end portions, close to the given second active area, of two adjacent first active areas. The first gate line covers each of the first channel regions in a column of the first active areas. The second gate line covers each of the second channel regions in a column of the second active areas. The programming gate line covers each of the first programming regions in a column of the first active areas, and the programming gate line further covers each of the second programming regions in a column of the second active areas.

Correspondingly, the embodiments of the present disclosure further provide a memory, which includes the anti-fuse array described in any one of the above embodiments.

BRIEF DESCRIPTION OF THE DRAWINGS

Exemplary descriptions are made to one or more embodiments with reference to pictures in the corresponding drawings, and these exemplary descriptions do not constitute limitations on the embodiments. Unless otherwise stated, the figures in the accompanying drawings do not constitute a scale limitation. To describe the technical solutions of the embodiments of the present disclosure or those of the prior art more clearly, the accompanying drawings required for describing the embodiments will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

It may be known from the background that the current anti-fuse array has the relatively low integration level.

Embodiments of the present disclosure provide an anti-fuse array, which includes at least a column of first active areas and at least a column of second active areas, where both the first active areas and the second active areas are configured to respectively form anti-fuse memory cells. An end portion, close to each first active area, of each second active area directly faces a region between end portions, close to the second active area, of two adjacent first active areas, and a distance between the end portions of the two adjacent first active areas is greater than a distance between central portions of the two adjacent first active areas, such that there is more available space between the end portions of the two adjacent first active areas. That is, each second active area is arranged in a spare region between the end portions of the two adjacent first active areas, such that the region between the end portions of the two adjacent first active areas may be utilized. Thus, utilization of space in the anti-fuse array is increased, and integration level of anti-fuse circuits in the anti-fuse array is improved.

The embodiments of the present disclosure will be described in detail below in conjunction with the accompanying drawings. However, a person of ordinary skill in the art may understand that in the embodiments of the present disclosure, many technical details are put forward such that a reader can better understand the present disclosure. However, the technical solutions requested to be protected by the present disclosure may also be implemented even without these technical details or various variations and modifications based on the following embodiments.

Figure 1:
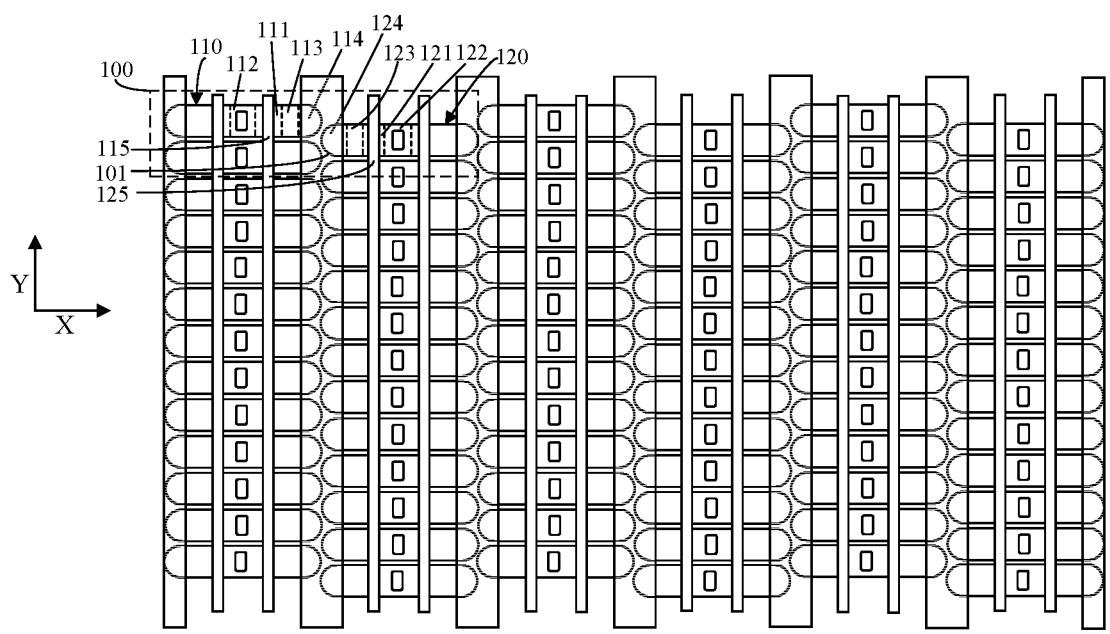
FIG. 1 is a schematic diagram showing a layout structure of an anti-fuse array according to an embodiment of the present disclosure.
Figure 2:
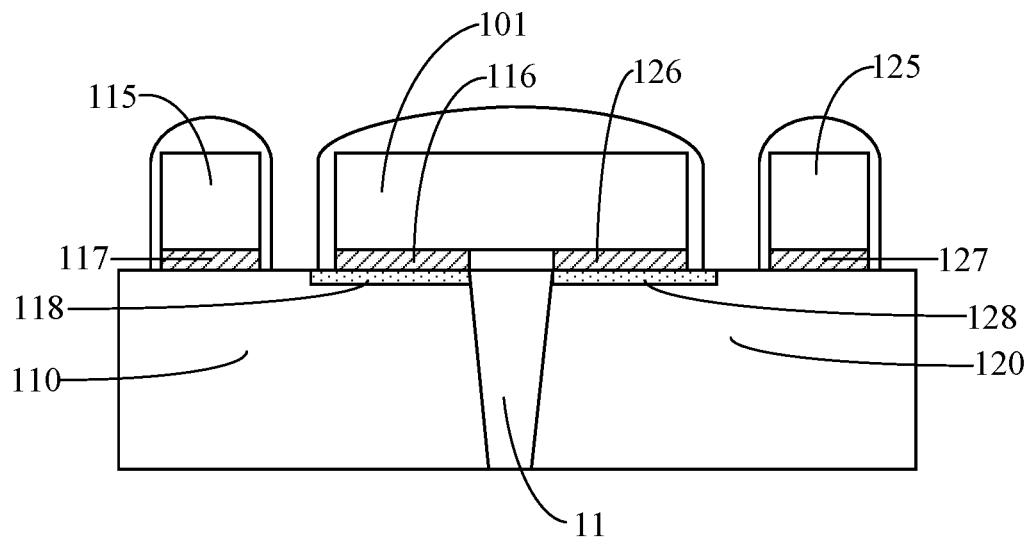
FIG. 2 is a schematic partial cross-sectional structural diagram of an anti-fuse array according to an embodiment of the present disclosure.
Figure 3:
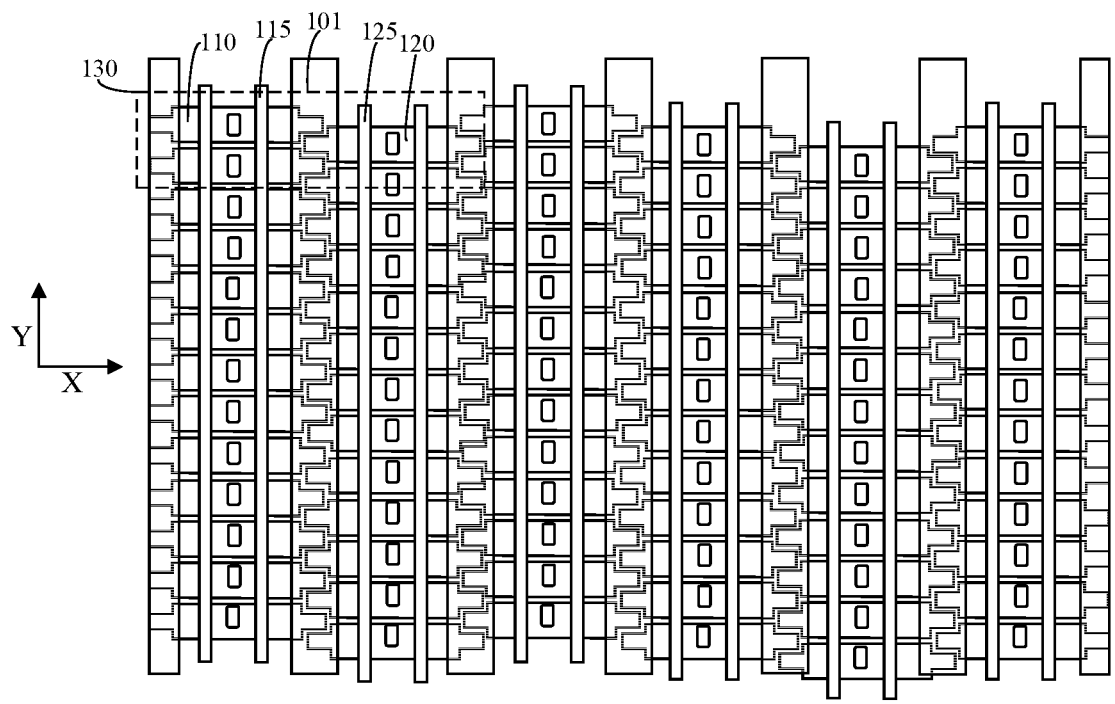
FIG. 3 is a schematic diagram showing a layout structure of another anti-fuse array according to an embodiment of the present disclosure.

FIG. 1 is a schematic diagram showing a layout structure of an anti-fuse array according to an embodiment of the present disclosure, FIG. 2 is a schematic partial cross-sectional structural diagram of an anti-fuse array according to an embodiment of the present disclosure, and FIG. 3 is a schematic diagram showing a layout structure of another anti-fuse array according to an embodiment of the present disclosure. It is worth noting that to reflect a positional relationship between structures in the anti-fuse array, first gate lines, second gate lines and programming gate lines in FIG. 1 and FIG. 3 are shown perspectively.

Referring to FIGS. 1 to 3, the anti-fuse array includes: at least a column of first active areas 110, at least a column of second active areas 120, a first gate line 115, a second gate line 125, and a programming gate line 101. The first active areas 110 extend along a first direction X, and each of the first active areas 110 includes: a first channel region 111, a first source/drain region 112 and a second source/drain region 113 disposed on two sides of the first channel region 111, and a first programming region 114. The first programming region 114 is disposed at an end portion of the first active area 110, and a distance between end portions of two adjacent first active areas 110 is greater than a distance between central portions of the two adjacent first active areas 110. The second active areas 120 extend along the first direction X, and each of the second active areas 120 includes: a second channel region 121, a third source/drain region 122 and a fourth source/drain region 123 disposed on two sides of the second channel region 121, and a second programming region 124. The second programming region 124 is disposed at an end portion of the second active area 120, where an end portion, close to the first active areas 110, of the second active area 120 directly faces a region between end portions, close to the second active area 120, of two adjacent first active areas 110. The first gate line 115 covers each of the first channel regions 111 in a column of the first active areas 110. The second gate line 125 covers each of the second channel regions 121 in a column of the second active areas 120. The programming gate line 101 covers each of the first programming regions 114 in a column of the first active areas 110, and the programming gate line 101 further covers each of the second programming regions 124 in a column of the second active areas 120.

In the embodiments of the present disclosure, the distance between end portions of the two adjacent first active areas 110 is greater than the distance between central portions of the two adjacent first active areas 110, and end portions, close to the first active areas 110, of the two second active area 120 directly face a region between the ends, close to the second active area 120, of the two adjacent first active areas 110. In this way, each second active area 120 is arranged in available space between the end portions of the two adjacent first active areas 110, such that the spare space between the end portions of the two adjacent first active areas 110 may be utilized. Thus, utilization of space in the anti-fuse array is increased, and integration level of the anti-fuse array is improved.

In the first active area 110, the first channel region 111, the first source/drain region 112 and the second source/drain region 113 on two sides of the first channel region 111 form a first access transistor, and the first programming region 114 is electrically connected to the first source/drain region 112 or the second source/drain region 113 to form a first anti-fuse memory cell together with the programming gate line 101. In some embodiments, the first source/drain region 112 may serve as a source region of the first access transistor, the second source/drain region 113 may serve as a drain region of the first access transistor, and the first programming region 114 is electrically connected to the second source/drain region 113. The first access transistor and the first anti-fuse memory cell form a first anti-fuse circuit.

In some embodiments, the type of doped ions in the first channel region 111 may be the same as the type of doped ions in the first source/drain region 112 and the second source/drain region 113, such that a junctionless transistor is formed; and the type of doped ions in the programming region 114 is the same as the type of doped ions in the second source/drain region 113, such that when the first channel region 111 is turned on, the carriers in the first channel region 111 may be transferred into the first programming region 114. In some other embodiments, the type of doped ions in the first channel region 111 may also be different from the type of doped ions in the first source/drain region 112 and the second source/drain region 113, such that a junction transistor is formed.

The first gate line 115 covers each of the first channel regions 111 in a column of the first active areas 110 to turn on the first access transistor based on a control signal. In some embodiments, the first gate line 115 and the first channel region 111 may be electrically connected through a conductive plug, and a material of the first gate line 115 may be semiconductor material or metal, where the semiconductor material may be polysilicon, and the metal material may be any one of tungsten, copper or aluminum.

In the second active area 120, the second channel region 121, and the third source/drain region 122 and the fourth source/drain region 123 on two sides of the second channel region 121 form a second access transistor, and the second programming region 124 is electrically connected to the third source/drain region 122 or the fourth source/drain region 123 to form a second anti-fuse memory cell together with the programming gate line 101. In some embodiments, the third source/drain region 122 may serve as a source region of the second access transistor, the fourth source/drain region 123 may serve as a drain region of the second access transistor, and the second programming region 124 is electrically connected the fourth source/drain region 123. The second access transistor and the second anti-fuse memory cell form a second anti-fuse circuit.

In some embodiments, the type of doped ions in the second channel region 121 may be the same as the type of doped ions in the third source/drain region 122 and the fourth source/drain region 123, such that the junctionless transistor is formed; and the type of doped ions in the second programming region 124 is the same as the type of the doped ions in the fourth source/drain region 123, such that when the second channel region 121 is turned on, carriers in the second channel region 121 may be transferred into the second programming region 124. In some other embodiments, the type of the doped ions in the second channel region 121 may also be different from the type of the doped ions in the third source/drain region 122 and the fourth source/drain region 123, such that the junction transistor is formed.

The second gate line 125 covers each of the second channel regions 121 in a column of the second active areas 120 to turn on the second access transistor based on the control signal. In some embodiments, the second gate line 125 and the first channel region 111 may be electrically connected through the conductive plug, and a material of the second gate line 125 may be semiconductor material or metal, where the semiconductor material may be polysilicon, and the metal material may be any one of tungsten, copper or aluminum.

The programming gate line 101 covers the first programming region 114 and the second programming region 124, and is configured to write a programming voltage to the first anti-fuse memory cell and the second anti-fuse memory cell, such that the first anti-fuse memory cell and the second anti-fuse memory cell are broken down.

Referring to FIG. 2, the anti-fuse array further includes a first insulating layer 116 and a second insulating layer 126. The first insulating layer 116 covers the first active area 110 of the first programming region 114, and the first insulating layer 116 is disposed between the programming gate line 101 and the first active area 110, to form a first capacitor. The second insulating layer 126 covers the second active area 120 of the second programming region 124, and the second insulating layer 126 is disposed between the programming gate line 101 and the second active area 120, to form a second capacitor. When the first anti-fuse memory cell and the second anti-fuse memory cell are in an unprogrammed state, due to the existence of the first insulating layer 116 and the second insulating layer 126, the first capacitor in the first anti-fuse circuit and the second capacitor in the second anti-fuse circuit are in a high-resistance state. After programming, the first insulating layer 116 and the second insulating layer 126 are broken down, which is equivalent to a fact that the first capacitor and the second capacitor are broken down, and thus the first capacitor and the second capacitor are in a low-resistance state. In this case, by reading the change of the resistance state of the first anti-fuse memory cell and the second anti-fuse memory cell, a write operation on the first anti-fuse cell and the second anti-fuse cell is completed.

In some embodiments, the anti-fuse array further includes a first gate dielectric layer 117 and a second gate dielectric layer 127. The first gate dielectric layer 117 covers the first channel region 111, and the first gate dielectric layer 117 is disposed between the first channel region 111 the first active area 110. The second gate dielectric layer 127 covers the second channel region 121 and is disposed between the second channel region 121 and the second active area 120. The first gate dielectric layer 117 is configured to form a gate dielectric layer of the first access transistor, and is configured to isolate the first gate line 115 from the first channel region 111. The second gate dielectric layer 127 is configured to form a gate dielectric layer of the second access transistor layer, and is configured to isolate the second gate line 125 from the second channel region 121. The existence of the first gate dielectric layer 117 and the second gate dielectric layer 127 allows the first access transistor and the second access transistor to be low-voltage devices. That is, the first access transistor and the second access transistor can be turned on only by applying a lower voltage to the first gate line 115 and the second gate line 125.

In some embodiments, materials of the first gate dielectric layer 117, the second gate dielectric layer 127, the first insulating layer 116 and the second insulating layer 126 may be the same, for example, may be silicon oxide. On this basis, the first gate dielectric layer 117, the second gate dielectric layer 127, the first insulating layer 116 and the second insulating layer 126 may be simultaneously formed in the same process step.

In some embodiments, the anti-fuse array further includes: a first doped region 118 disposed in the first programming region 114 and a second doped region 128 disposed in the second programming region 124. The first active area 110 exposes a top surface of the first doped region 118, and the first insulating layer 116 is in contact with the first doped region 118. The second active area 120 exposes a top surface of the second doped region 128, and the second insulating layer 126 is in contact with the second doped region 128. In some embodiments, the type of doped ions in the first doped region 118 is the same as the type of doped ions in the first programming region 114, and the type of doped ions in the second doped region 128 is the same as the type of doped ions in the second programming region 124. In some embodiments, the first doped region 118 and the second doped region 128 may serve as heavily doped regions disposed in the first programming region 114 and the second programming region 124. The existence of the first doped region 118 and the second doped region 128 may allow the first insulating layer 116 and the second insulating layer 126 to be more easily broken down, thereby completing data write.

In some embodiments, an isolation layer 11 is provided between the first active area 110 and the second active area 120, and the isolation layer 11 is configured to separate the first active area 110 from the second active area 120, thereby preventing the second programming region 124 of the second active area 120 from being interfered when the first programming region 114 of the first active area 110 is in a programming state. In some embodiments, a material of the isolation layer 11 may be silicon oxide.

In some embodiments, the first programming region 114 is arranged opposite to the second programming region 124. That is, the first programming region 114 is disposed at an end portion, close to the second active area 120, of the first active area 110, and the second programming region 124 is disposed at an end portion, close to the first active area 110, of the second active area 120. Because the end portion, close to the first active areas 110, of the second active area 120 directly faces the region between the end portions, close to the second active area 120, of the two adjacent first active areas 110. That is, the end portion, close to the first active area 110, of the second active area 120 is disposed in the spare region between the end portions of the two adjacent first active areas 110, such that the end portion of the first active area 110 is closer to the end portion of the second active area 120. On this basis, the first programming region 114 and the second programming region 124 are set to share the same programming gate line 101. In one aspect, the programming gate line 101 may simultaneously cover the first programming region 114 and the second programming region 124 without greatly increasing a width of the programming gate line 101. In another aspect, the first anti-fuse circuit and the second anti-fuse circuit may share the same programming gate line 101, such that number of the programming gate lines 101 in the anti-fuse array may be decreased, and a dimension of the anti-fuse array may be reduced, thereby further improving the integration level of the anti-fuse array.

Figure 4:
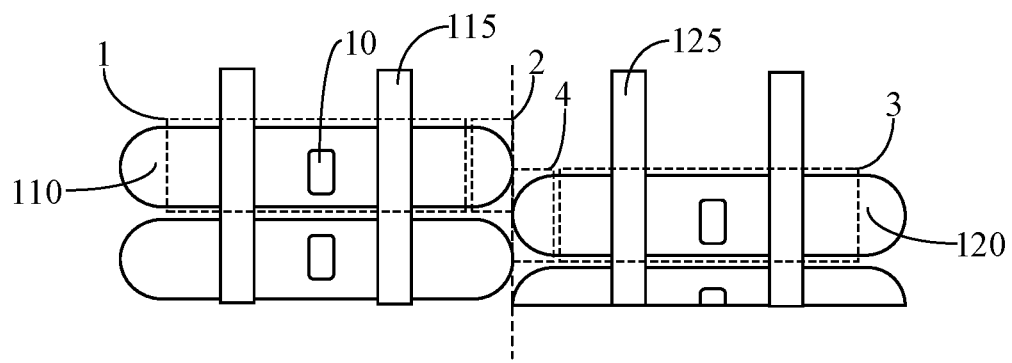
FIG. 4 is an enlarged view of the structure in dashed frame 100 in FIG. 1.

Referring to FIG. 4, FIG. 4 is an enlarged view of the structure in dashed frame 100 in FIG. 1. In some embodiments, the first active area 110 includes a first central region 1 and first end portion regions 2 disposed on two sides of the first central region 1; and the second active area 120 includes a second central region 3 and second end portion regions 4 disposed on two sides of the second central region 3, where a width of each of the first end portion regions 2 is smaller than a width of the first central region 1, and a width of each of the second end portion regions 4 is smaller than a width of the second central region 3. That is, the distance between the end portions of the two adjacent second active areas 120 is greater than the distance between the central portions of the two adjacent second active areas 120. In this way, the space between the end portions of the two adjacent first active areas 110 is larger than the space between the central portions thereof, and the space between the end portions of the two adjacent second active areas 120 is larger than the space between the central portions thereof. When the end portion of the second active area 120 is disposed between the end portions of the two adjacent first active areas 110, the end portion, close to the second active area 120, of the first active area 110 is also disposed between the end portions of the two adjacent second active areas 120, such that the end portion of the first active area 110 and the end portion of the second active area 120 are staggered with each other, and the space between the end portions of the adjacent first active areas 110 and the end portions of the adjacent second active areas 120 may be utilized while the central portions of the first active area 110 and the second active area 120 are closely arranged to increase the space utilization, thereby improving the integration level of the anti-fuse array.

In some embodiments, the width of the first central region 1 is equal to the width of the second central region 3. In this way, an overall dimension of the first active area 110 is approximate to that of the second active area 120, such that after the first active areas 110 and the second active areas 120 are in one-to-one correspondence with each other, the distance between the first active area 110 and the second active area 120 is not too large, and the distance between the first programming region 114 and the second programming region 124 sharing the same programming gate line 101 is relatively small, which is advantageous to reducing the dimension of the anti-fuse array.

It is to be understood that because the width of the first end portion region 2 is smaller than that of the first central region 1 and the width of the second end portion region 4 is smaller than that of the second central region 3, when a column of the first active areas 110 and a column of the second active areas 120 are spaced, the distance between the first end portion regions 2 of the two adjacent first active areas 110 may be relatively small, and the distance between the second end portion regions 4 of the two adjacent second active areas 120 may be relatively small. In this way, the distance between the two adjacent first central regions 1 and the distance between the two adjacent second central regions 3 are reduced to the greater extent while the first end portion regions 2 and the second end portion regions 4 are staggered with each other, thereby rationally utilizing the space.

In some embodiments, the distance between the first central regions 1 of the adjacent two first active areas 110 in a column of the first active areas 110 is equal to the distance between the second central regions 3 of the adjacent two second active areas 120 in a column of the second active areas 120. That is, an arrangement distance between a column of the first active areas 110 and a column of the second active areas 120 is equal, which is advantageous to reducing difficulty of staggered arrangement of each of the first active areas 110 and each of the second active areas 120 in the second direction.

In some embodiments, in a column of the first active areas 110, the distance between the first central regions 1 of the two adjacent first active areas 110 is in a range of 0.1 μm to 0.3 μm; and in a column of the second active area 120, the distance between the second central regions 3 of the two adjacent second active areas 120 is in a range of 0.1 μm to 0.3 μm. Within this range, in one aspect, a minimum distance between the two adjacent first active areas 110 and a minimum distance between the two adjacent second active areas 120 are relatively small, such that the space of the anti-fuse array may be fully utilized, thereby improving the integration level of the anti-fuse array. In another aspect, within this range, the minimum distance between the two adjacent first active areas 110 and the minimum distance between the two adjacent second active areas 120 are not too small, such that electrical interference between the two adjacent first active areas 110 and between the two adjacent second active areas 120 due to the too small distance between the two first active area 110 and between the two second active areas 120 is prevented.

Figure 5:
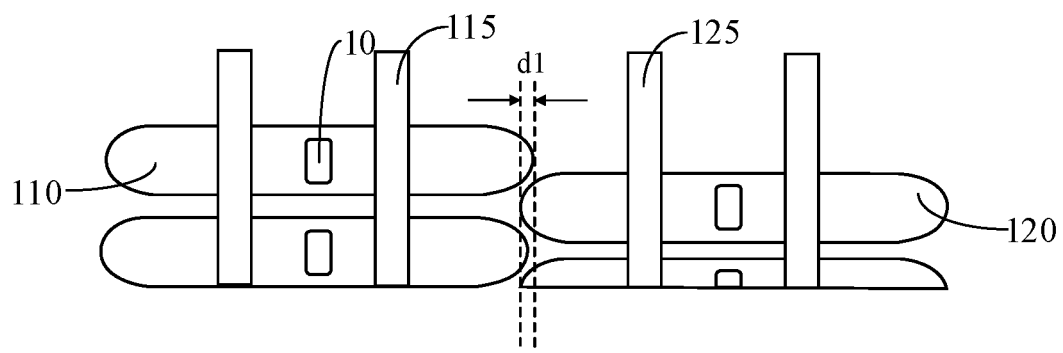
FIG. 5 is another enlarged view of the structure in dashed frame 100 in FIG. 1.

Referring to FIG. 1, FIG. 4 and FIG. 5, FIG. 5 is another enlarged view of the structure in dashed frame 100 in FIG. 1. In some embodiments, in a column of the first active areas 110, the distance between the first end portion regions 2 of the two adjacent first active areas in a second direction Y gradually increases from an inner side to an outer side along the first direction X; and in a column of the second active areas 120, the distance between the second end portion regions 4 of the two adjacent second active areas 120 in the second direction Y gradually increases from an inner side to an outer side, where the second direction Y is an arrangement direction of a column of the first active areas 110. From an inner side to an outer side referred to here is as follows: the side, close to the second active area 120, of the first end portion region 2 is taken as the outer side, the side of the first end portion region 2 away from the second active area 120 is taken as the inner side, the side, close to the first active area 110, of the second end portion region 4 is taken as the outer side, and the side of the second end portion region 4 away from the first active area 110 is taken as the inner side. Compared with a fact that the distance between the first end portion regions 2 of the two adjacent first active areas 110 in the second direction is unchanged, i.e., compared with a fact that the width of the first end portion region 2 is suddenly reduced with respect to the width of the first central region 1, the distance between the first end portion regions 2 of the two adjacent first active areas 110 is set to be gradually increased, such that during actual fabrication of the first active areas 110, the process difficulty of fabricating the end portions of the first active areas 110 may be lowered. This is because, in the actual technological processes, the substrate needs to be subjected to diffusion of doped ions by means of a doping process to form the first active area 110. However, in the actual technological processes for fabricating the first doped region 118, it is relatively difficult to control the diffusion of the doped ions in the doping process. Therefore, the distance between the two adjacent first end portion regions 2 is set to be gradually increased. That is, the degree of diffusion of the doped ions in the adjacent first end portion regions 2 is gradually reduced, which is advantageous to reducing the process difficulty and improving a process window for fabricating the first active area 110.

In addition, because the distance between the two adjacent first end portion regions 2 is gradually reduced, the distance between the first end portion regions 2 away from the second active area 120 is relatively small. To prevent the first active area 110 and the second active area 120 from being in contact with each other, the end portion of the second active area 120 is set not to directly face the first end portion region 2 away from the second active area 120. Therefore, the dimension of the isolation layer 11 corresponding to the part of the first end portion region 2 away from the second active area 120 is relatively large, such that the adjacent first active area 110 and second active area 120 may be better isolated, thereby preventing occurrence of the electrical interference between the first active area 110 and the second active area 120.

The distance between the second end portion regions 4 of the adjacent second active areas 120 in the second direction also increases gradually from an inner side to an outer side. That is, along the direction in which the second active area 120 points to the first active area 110, the width of the second end portion region 4 is gradually reduced, such that a shape of the second end portion region 4 is matched with a shape enclosed by the space between the two adjacent first end portion regions 2. Under the premise that the first active area 110 and the second active area 120 are not in contact with each other, more second end portion regions 4 may be disposed between the two adjacent second end portion regions 4, thereby further improving the utilization of space in the anti-fuse array.

Referring to FIG. 4 and FIG. 5, in some embodiments, both the planar contour of the first end portion region 2 and the planar contour of the second end portion region 4 have arc shapes. In some embodiments, the arc shape may be a semi-circle or a semi-ellipse, which is advantageous to simplifying the actual process for fabricating the first end portion region 2 and the second end portion region 4.

Referring to FIG. 5, in some embodiments, the second end portion region 4 at least partially directly faces the first end portion region 2 in the second direction. That is, the second end portion region 4 is disposed between the two adjacent first end portion regions 2, such that the space between the two adjacent first end portion regions 2 is utilized, thereby reducing the dimension of the anti-fuse array in the first direction X. The number of first active areas 110 and the number of second active areas 120 in the first direction X may be increased while the overall dimension of the anti-fuse array is unchanged, thereby improving the integration level of the anti-fuse array.

In some embodiments, along the first direction X, a relative distance between an end surface, close to a given one of the second active areas 120, of a given one of the first active areas 110 and an end surface, close to the given first active area 110, of the given second active area 120 is less than or equal to 0.3 µm. In some embodiments, the end surface of the first active area 110 is taken as an origin, and the direction in which the first active area 110 points to the second active area 120 is taken as a positive direction. That is, when the second end portion region 4 does not at least partially directly face the first end portion region 2 in the second direction, the end surface of the second end portion region 4 is disposed in the positive direction of the origin, and the distance between the two adjacent first end portion region 2 and second end portion region 4 is positive; and when the first end portion region 2 at least partially directly faces the second end portion region 4 in the second direction, the end surface of the second end portion region 4 is disposed in the negative direction of the origin, and the distance between the end surface of the first end portion region 2 and the end surface of the second end portion region 4 is negative. That is, when the second end portion region 4 at least partially directly faces the first end portion region 2 in the second direction, along the first direction X, the distance between the end surface of the first active area 110 close to the second active area 120 and the end surface of the second active area 120 close to the first active area 110 is negative. Within this range, in one aspect, the staggered dimension of the first end portion region 2 and the second end portion region 4 is relatively large. That is, the dimension of the second end portion region 4 disposed between the two adjacent first end portion regions 2 is relatively large, such that the utilization of space between the two adjacent first end portion regions 2 may be greatly increased. In another aspect, the staggered dimension of the first end portion region 2 and the second end portion region 4 is not too large, such that the first end portion region 2 and the second end portion region 4 may be prevented from being too close to each other, thereby avoiding the electrical interference between the first active area 110 and the second active area 120.

Referring to FIG. 4, in some other embodiments, along the first direction X, the relative distance between the end surface, close to the second active area 120, of the first active area 110 and the end surface, close to the first active area 110, of the second active area 120 may be 0. That is, in the second direction, the end surfaces of the adjacent first end portion regions 2 along the first direction X are flush with the end surfaces of the second end portion regions 4. In this way, the side surface of the first end portion region 2 in the second direction does not directly face the side surface of the second end portion region 4 in the second direction, and when the distance between the two adjacent first end portion regions 2 gradually increases, the contact between the first end portion region 2 and the second end portion region 4 due to the fact that the too many second end portion regions 4 are disposed between the two adjacent first end portion regions 2 may be prevented, thereby preventing the electrical interference between the first end portion region 2 and the second end portion region 4.

It is to be understood that in some embodiments, the distance between the end surface of the first end portion region 2 and the end surface of the second end portion region 4 may also be positive. That is, the end surface of the second end portion region 4 may also be disposed on the side of the end surface of the first end portion region 2 away from the first central region 1.

Figure 6:
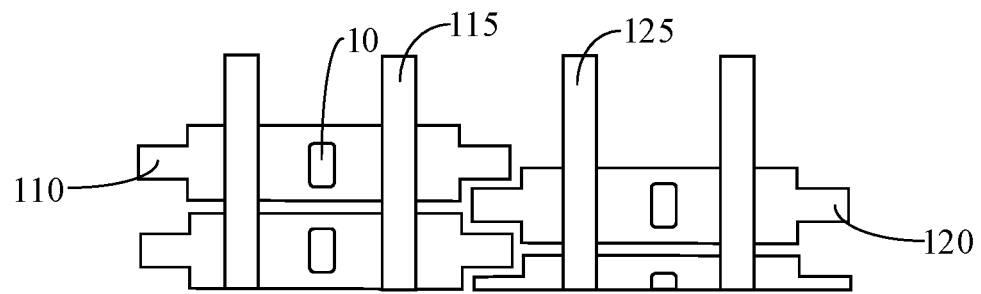
FIG. 6 is an enlarged view of the structure in dashed frame 130 in FIG. 3.

Referring to FIG. 3 and FIG. 6, FIG. 6 is an enlarged view of the structure in dashed frame 130 in FIG. 3. In some embodiments, a cross-sectional shape of the first end portion region 2 in the second direction is a rectangle, and a cross-sectional shape of the second end portion region 4 in the second direction is a rectangle, where the second direction is an arrangement direction of a column of the first active areas 110. That is, the distance between the two adjacent first end portion regions 2 is unchanged, and the distance between the two adjacent second end portion regions 4 is unchanged. In this way, the second end portion regions 4 may be inserted into the region between the two adjacent first end portion regions 2, such that the area of the first end portion region 2 directly facing the second end portion region 4 may be further increased to fully utilize the spare region between the adjacent first end portion regions 2, thereby further increasing the space utilization.

On this basis, in some embodiments, along the second direction, the second end portion region 4 directly faces the two adjacent first end portion regions 2. The distance between the two adjacent first end portion regions 2 is unchanged, and the distance between the two adjacent second end portion regions 4 is unchanged. Therefore, even if the second end portion region 4 is completely inserted into the space between the two adjacent second end portion regions 4, because the distance between the two adjacent first end portion regions 2 may not be decreased, the distance between the first end portion region 2 and the second end portion region 4 in the second direction always keeps unchanged, such that contact between the two adjacent first end portion regions 2 in the second direction may be prevented, and normal performance of the anti-fuse array is maintained while the space utilization of the anti-fuse array is increased.

Figure 7:
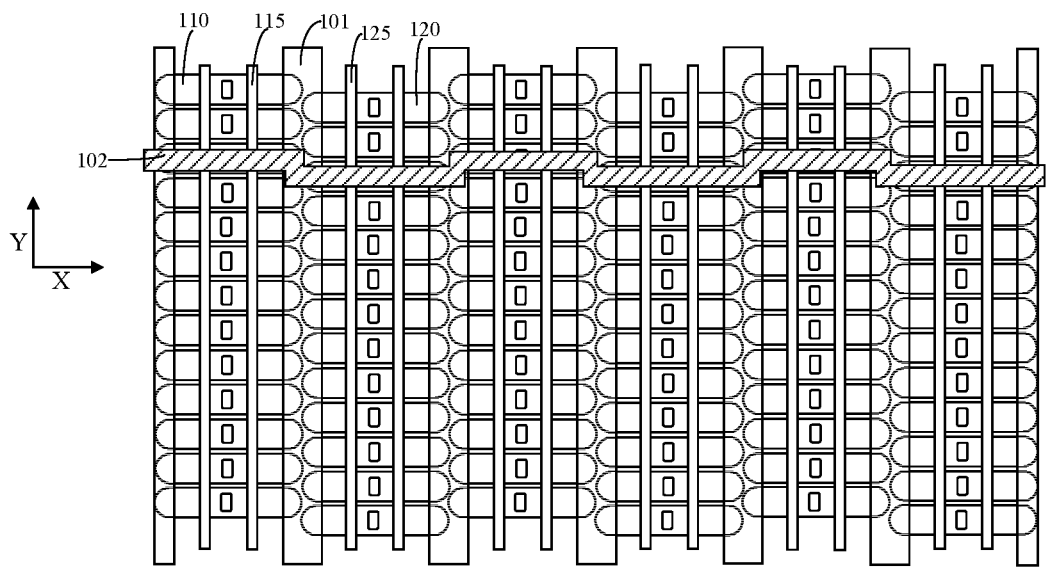
FIG. 7 is a schematic diagram showing a layout structure of yet another anti-fuse array according to an embodiment of the present disclosure.

Referring to FIG. 7, FIG. 7 is a schematic diagram showing a layout structure of yet another anti-fuse array according to an embodiment of the present disclosure. In some embodiments, the anti-fuse array further includes a plurality of bit lines 102, where each of the bit lines 102 is at least electrically connected to one first source/drain region 112 and one third source/drain region 122. It is worth noting that only one bit line is shown in FIG. 7. In fact, the anti-fuse array has the plurality of bit lines. That is, the first active area 110 and the second active area 120 share the same bit line 102. In some embodiments, the first source/drain region 112 may serve as a source of the first access transistor, and the third source/drain region 122 may serve as a source of the second access transistor. The bit line 102 is electrically connected to the source of the first access transistor and the source of the second access transistor. The bit line 102 is configured to provide a data voltage to a drain of the first access transistor and a drain of the second access transistor when the first access transistor and the second access transistor are turned on, such that a voltage difference is formed between the voltage across the drain of the first access transistor and the drain the second access transistor and the programming voltage, to break down the first insulating layer 116 and the second insulating layer 126, thereby completing data write.

In some embodiments, the bit line 102 is electrically connected to the third source/drain region 122 of the second active area 120, and is also electrically connected to the first source/drain region 112 of one of the two first active areas 110 corresponding to the second active area 120. The two first active areas 110 corresponding to the second active area 120 are two first active areas 110 opposite to the second active area 120 in the first direction X. It is to be understood that compared with rest of the first active areas 110, the second active area 120 is closer to the two first active areas 110 opposite to the second active area 120. Therefore, the bit line 102 is arranged to cover the third source/drain region 122 of the second active area 120 and the first source/drain region 112 of one of the two first active areas 110 opposite to the second active area 120, such that a span of the second bit line 102 in the first direction X is relatively small, thereby reducing the dimension of the bit line 102, which is advantageous to simplifying routing arrangement of the bit line 102 and simplifying the layout design of the anti-fuse array.

Referring to FIG. 1, in some embodiments, the first active area 110 has two first channel regions 111, two second source/drain regions 113, and two first programming regions 114. The two first channel regions 111, the two second source/drain regions 113 and the first source/drain regions 112 are configured to form two first access transistors, and the two first access transistors corresponding to the first active area 110 share the same first source/drain region 112. The second active area 120 has two second channel regions 121, two fourth source/drain regions 123, and two second programming regions 124. The two second channel regions 121, the two fourth source/drain regions 123 and the third source/drain regions 122 are configured to form two second access transistors, and the two second access transistors corresponding to the second active area 120 share the same third source/drain region 122.

In some embodiments, in the first active area 110, the first source/drain region 112 (referring to FIG. 1) is disposed between two adjacent first channel regions 11, and the two second source/drain regions 113 are disposed on a side of the first channel region 111 away from the first source/drain region 112, and the two first programming regions 114 are disposed on a side of the second source/drain region 113 away from the first channel region 111. The first source/drain region 112 serves as the source of the first access transistor, and the second source/drain region 113 serves as the drain the first access transistor. The bit line 102 covers the first source/drain region 112 of the first active area 110 and is electrically connected to the first source/drain region 112. In some embodiments, the bit line 102 and the first source/drain region 112 may be electrically connected via the conductive plug 10.

In the second active area 120, the third source/drain region 122 is disposed between the two adjacent second channel regions 121, and the two fourth source/drain regions 123 are respectively disposed on a side of the second channel region 121 away from the third source/drain region 122, and the two second programming regions 124 are disposed on a side of the fourth source/drain region 123 away from the third source/drain region 122. The third source/drain region 122 serves as the source of the second access transistor, and the fourth source/drain region 123 serves as the drain the second access transistor. The bit line 102 covers the third source/drain region 122 of the second active area 120 and is electrically connected to the third source/drain region 122. In some embodiments, the bit line 102 and the third source/drain region 122 may be electrically connected via the conductive plug. That is, the sources of the two first access transistors share the same bit line 102, and the sources of the two second access transistors share the same bit line 102. In this way, when number of the anti-fuse circuits in the anti-fuse array is constant, the number of the first active areas 110 and the number of the second active areas 120 may be greatly reduced, such that the integration degree of the anti-fuse array can be greatly improved.

Figure 8:
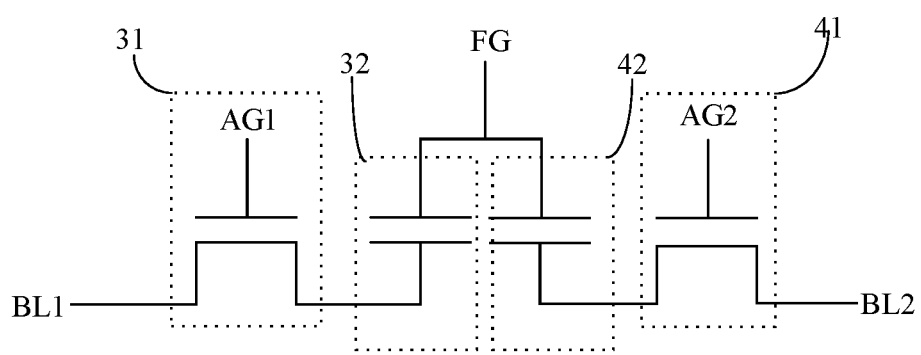
FIG. 8 is a corresponding anti-fuse circuit diagram in FIG. 7.

FIG. 8 is a corresponding anti-fuse circuit diagram in FIG. 7. The anti-fuse circuit at least includes: a first anti-fuse memory cell and a second anti-fuse memory cell. The first anti-fuse memory cell includes a first access transistor 21 and a first anti-fuse circuit 32; and the second anti-fuse memory cell include a second access transistor 41 and a second anti-fuse circuit 42. The first anti-fuse circuit 32 is electrically connected to a programming gate FG of the second anti-fuse circuit 42, and one of the source and the drain of the first access transistor 21 is electrically connected to a first bit line BL1, and other one of the source and the drain the first access transistor 21 is electrically connected to one end of the first anti-fuse circuit 32. One of the source and the drain of the second access transistor 41 is electrically connected to a second bit line BL2, and other one of the source and the drain of the second access transistor 41 is electrically connected to one end of the second anti-fuse circuit 42.

In some embodiments, the first anti-fuse circuit 32 may include a first capacitor, where an upper electrode of the first capacitor is electrically connected to the programming gate FG, and a lower electrode of the first capacitor is electrically connected to the source or the drain of the first access transistor 31. The second anti-fuse circuit 42 may include a second capacitor, where an upper electrode of the second capacitor is electrically connected to the programming gate FG, and a lower electrode of the second capacitor is electrically connected to the source or the drain of the second access transistor 41. When the first anti-fuse circuit 32 or the second anti-fuse circuit 42 is programmed, a programming voltage is applied to the programming gate FG. That is, the programming voltage is applied to the upper electrode of the first capacitor and the upper electrode of the second capacitor, and a data voltage such as a low voltage is applied to the lower electrode of the first capacitor and the lower electrode of the second capacitor by means of the first access transistor 21 and the second access transistor 41, to form a voltage difference between the upper electrode and the lower electrode, thereby breaking down the first capacitor and the second capacitor, such that the first capacitor and the second capacitor are changed from a high-resistance state to a low-resistance state, thereby completing the data write.

In some embodiments, the source of the first access transistor 21 is electrically connected to the first bit line BL1, and the drain the first access transistor 21 is electrically connected to the lower electrode of the capacitor of the first anti-fuse circuit 32. The source of the second access transistor 41 is electrically connected to the second bit line BL2, and the drain of the second access transistor 41 is electrically connected to the lower electrode of the second anti-fuse circuit 42. Circuit principles of the anti-fuse circuit for programming operation are as follows.

The process for writing data into the first anti-fuse memory cell includes: applying a selection voltage to a word line AG1 of the first access transistor 2, to turn on the first access transistor 21. The programming voltage such as a high voltage is applied to the programming gate FG of the first anti-fuse circuit 32. That is, the programming voltage is applied to the upper electrode of the first capacitor. The data voltage such as a low voltage (e.g. grounding voltage), is applied to the first bit line BL1 connected to the source of the first access transistor 21. A level of the drain the first access transistor 21 is pulled down to be the same as the level (the grounding voltage) of the source of the first access transistor 21, and the voltage of the lower electrode of the first capacitor in the first anti-fuse circuit 32 is pulled to the grounding voltage, such that a high-voltage difference is formed between the upper electrode of the first capacitor and the lower electrode of the first capacitor. The high-voltage difference breaks down the first capacitor to form a low-resistance path in the first anti-fuse circuit 32, thereby completing the data write.

It is to be understood that because the first anti-fuse circuit 32 and the second anti-fuse circuit 42 share the same programming gate FG, to respectively write the data into the first anti-fuse memory cell and the second anti-fuse memory cell, when the data are written into the first anti-fuse memory cell, a turn-off voltage may be applied to a word line AG2 of the second access transistor 41 (for example, when the second access transistor 41 is an NMOS transistor, the turn-off voltage may be the high voltage such as the power voltage; and when the second access transistor 41 is a PMOS transistor, the turn-off voltage may be the low voltage such as the grounding voltage) to turn off the second access transistor 41. Therefore, it may be prevented that the voltage difference is generated between the upper electrode and the lower electrode of the second capacitor in the second anti-fuse circuit 42 to break down the second capacitor.

The process for writing the data into the second anti-fuse memory cell is the same as the process for writing the data into the first anti-fuse memory cell, which may refer to the above description of the process for writing the data into the first anti-fuse memory capacitor, and may not be repeated below.

In the anti-fuse array provided by the above embodiments, an end portion, close to the first active areas 110, of the second active area 120 directly faces a region between end portions, close to the second active area 120, of two adjacent first active areas 110. In addition, the distance between the end portions of the two adjacent first active areas 110 is greater than the distance between the central portions of the two adjacent first active areas 110, such that there is more available space between the end portions of the two adjacent first active areas 110. That is, the second active area 120 is arranged in a spare region between the end portions of the two adjacent first active areas 110, such that the region between the end portions of the two adjacent first active areas 110 may be utilized. Thus, utilization of space in the anti-fuse array is increased, and the integration level of anti-fuse circuits in the anti-fuse array is improved.

Correspondingly, an embodiment of the present disclosure further provides a memory, which includes the anti-fuse array provided in the previous embodiment. The memory may be a Dynamic Random Access Memory (DRAM), Static Random-Access Memory (SRAM) or Synchronous Dynamic Random-Access Memory (SDRAM). Because the integration degree of the anti-fuse array is improved, when the anti-fuse array is configured to form the memory, it is advantageous to improving the integration degree of the memory.

Those of ordinary skill in the art can understand that the above-mentioned embodiments are some embodiments for realizing the present disclosure, but in practical applications, various changes may be made to them in form and details without departing from the spirit and scope of the present disclosure. Any person skilled in the art can make their own changes and modifications without departing from the spirit and scope of the present disclosure. Therefore, the protection scope of the present disclosure shall be subject to the scope defined by the claims.

What is claimed is:

1. An anti-fuse array, comprising:
at least a column of first active areas, the first active areas extending along a first direction, each of the first active areas comprising: a first channel region, a first source/drain region and a second source/drain region disposed on two sides of the first channel region, and a first programming region, the first programming region being disposed at an end portion of a given one of the first active areas, and a distance between closest edges of closest end portions of adjacent two of the first active areas being greater than a distance between closest edges of central portions of the adjacent two of the first active areas;
at least a column of second active areas, the second active areas extending along the first direction, each of the second active areas comprising: a second channel region, a third source/drain region and a fourth source/drain region disposed on two sides of the second channel region, and a second programming region, the second programming region being disposed at an end portion of a given one of the second active areas, wherein an end portion, closest to the first active areas, of the given second active area directly faces a region between end portions, closest to the given second active area, of two adjacent first active areas;

a first gate line, the first gate line covering each of the first channel regions in a given column of the first active areas;

a second gate line, the second gate line covering each of the second channel regions in a given column of the second active areas; and a programming gate line, the programming gate line covering each of the first programming regions in the given column of the first active areas, and the programming gate line further covering each of the second programming regions in the given column of the second active areas.

2. The anti-fuse array according to claim 1, wherein each of the first active areas comprises a first central region and first end portion regions disposed on two sides of the first central region; and each of the second active areas comprises a second central region and second end portion regions disposed on two sides of the second central region, wherein a width of each of the first end portion regions is smaller than a width of the first central region, and a width of each of the second end portion regions is smaller than a width of the second central region.

3. The anti-fuse array according to claim 2, wherein the width of the first central region is equal to the width of the second central region.

4. The anti-fuse array according to claim 2, wherein a distance between the first central regions of adjacent two of the first active areas in a column of the first active areas is equal to a distance between the second central regions of adjacent two of the second active areas in a column of the second active areas.

5. The anti-fuse array according to claim 4, wherein the distance between the first central regions of the two adjacent first active areas in a column of the first active areas is in a range of 0.1 μm to 0.3 μm; and the distance between the second central regions of the two adjacent second active areas in a column of the second active areas is in a range of 0.1 μm to 0.3 μm.

6. The anti-fuse array according to claim 2, wherein in a column of the first active areas, a distance between the first end portion regions of adjacent two of the first active areas in a second direction gradually increases from an inner side to an outer side along the first direction; in a column of the second active areas, a distance between the second end portion regions of adjacent two of the second active areas in the second direction gradually increases from an inner side to an outer side; and the second direction is an arrangement direction of a column of the first active areas.

7. The anti-fuse array according to claim 6, wherein both a planar contour of each of the first end portion regions and a planar contour of each of the second end portion regions have arc shapes.

8. The anti-fuse array according to claim 6, wherein the second end portion regions at least partially directly face the first end portion regions in the second direction.

9. The anti-fuse array according to claim 8, wherein along the first direction, a relative distance between an end surface, closest to a given one of the second active areas, of a given one of the first active areas and an end surface, closest to the given first active area, of the given second active area is less than or equal to 0.3 μm.

10. The anti-fuse array according to claim 6, wherein along the first direction, a relative distance between an end surface, closest to a given one of the second active areas, of a given one of the first active areas and an end surface, closest to the given first active area, of the given second active area is 0.

11. The anti-fuse array according to claim 2, wherein a cross-sectional shape of a given one of the first end portion regions in a second direction is a rectangle; and a cross-sectional shape of a given one of the second end portion regions in the second direction is a rectangle, the second direction being an arrangement direction of a column of the first active areas.

12. The anti-fuse array according to claim 11, wherein along the second direction, a given one of the second end portion regions directly faces adjacent two of the first end portion regions.

13. The anti-fuse array according to claim 1, further comprising: a plurality of bit lines, wherein each of the plurality of bit lines is at least electrically connected to one of the first source/drain regions and one of the third source/drain regions.

14. The anti-fuse array according to claim 13, wherein each of the plurality of bit lines is electrically connected to the third source/drain region of the given second active area, and is further electrically connected to the first source/drain region of one of the two first active areas corresponding to the given second active area.

15. The anti-fuse array according to claim 1, wherein each of the first active areas has two first channel regions and two second source/drain regions, the two first channel regions the two second source/drain regions and the first source/drain region are configured to form two first access transistors, and the two first access transistors corresponding to each of the first active areas share the same first source/drain region; and each of the second active areas has two second channel regions and two fourth source/drain regions the two second channel regions, the two fourth source/drain regions, and the third source/drain region are configured to form two second access transistors, and the two second access transistors corresponding to each of the second active areas share the same third source/drain region.

16. A memory, comprising: the anti-fuse array according to claim 1.

* * * * *